Figure 1:
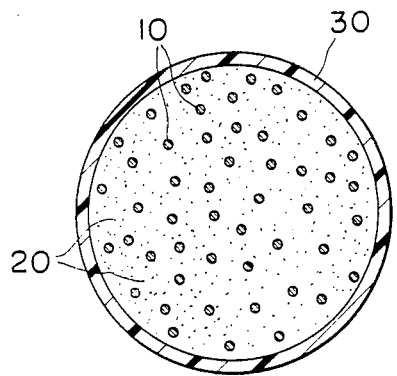

United States Patent [19]

Okura et al.

[11] Patent Number: 4,772,502

[45] Date of Patent: Sep. 20, 1988

[54] PREFORMED YARN USEFUL IN FORMING COMPOSITE ARTICLES AND PROCESS OF PRODUCING SAME

[75] Inventors: Akimitsu Okura, Tokyo; Toshoku Cho, Chiba; Takao Nakagawa, Kashiwa; Shimpei Gomi, Tokyo; Takuya Ueda, Zushi, all of Japan

[73] Assignee: Across Co., Ltd., Japan

[21] Appl. No.: 78,978

[22] Filed: Jul. 29, 1987

[30] Foreign Application Priority Data

Aug. 2, 1986 [JP] Japan .................................. 61-182483

[51] Int. Cl.⁴ ............................ B32B 1/04; B32B 3/02
[52] U.S. Cl. ..................................... 428/74; 428/295; 428/283; 428/323; 428/368; 428/373; 428/375; 428/392; 428/400; 428/408
[58] Field of Search .................. 428/74, 368, 373, 400, 428/408, 389, 392, 295, 283, 375, 323

[56] References Cited

U.S. PATENT DOCUMENTS 3,953,637  4/1976  Phillips ................................ 428/295
4,614,678  9/1986  Ganga .................................. 428/408

Primary Examiner—Sharon A. Gibson
Attorney, Agent, or Firm—Lorusso & Loud

[57] ABSTRACT

A preformed yarn useful in forming fiber-reinforced carbon composite articles is disclosed which includes a core of a multiplicity of inorganic reinforcing fibers, a mixed powder provided in the interstices between the fibers and including a finely divided carbonaceous binder pitch and a finely divided coke, and a flexible sleeve formed of a thermoplastic resin and surrounding the core.

6 Claims, 1 Drawing Sheet

PREFORMED YARN USEFUL IN FORMING COMPOSITE ARTICLES AND PROCESS OF PRODUCING SAME

This invention relates to a preformed yarn useful in forming fiber-reinforced carbon composite articles.

Inorganic fiber-reinforced carbon composites such as carbon fiber-reinforced carbon composites (generally known as "C—C composites") in which reinforcing fibers are dispersed within a matrix of carbon have excellent mechanical properties at high temperatures, such as a high bending strength and a high resistance to abrasion at high temperatures, and are used in a wide variety of applications, for example, for aerospace parts such as rocket nozzles, aerocraft parts such as sliders of brakes, working machine parts such as dies of high temperature hot press meachines, and as materials for atomic reactor parts.

One known method for the production of such C—C composites is a so-called CVD method in which a premold of carbon fibers having a desired shape is heated in a furnace to a high temperature while feeding a hydrocarbon gas to the furnace, so that the hydrocarbon is thermally cracked to form carbon which deposits on the surface of the premold. A process is also known in which yarns or woven or non-woven fabrics of carbon fibers are shaped into a desired structure with the use of a thermosetting resin binder such as a phenol resin or epoxy resin, the shaped body being subsequently heated in an inert gas atmosphere to carbonize the resin.

The prior art techniques encounter problems because the C—C composites obtained are not uniform in their physical and mechanical properties such as bending strength and density and because the processes are complicated and time consuming.

The present invention has been made in consideration of the problems involved in the conventional techniques and has its object to provide a novel preformed yarn which is useful as a precursor for fiber-reinforced carbon composites, which is excellent in workability and processability in the fabrication of composite articles and which gives highly heat-resisting composite articles exhibiting high and uniform mechanical strengths.

In accordance with one aspect of the present invention, there is provided a preformed yarn useful in forming composite articles, comprising:

a core of a multiplicity of inorganic reinforcing fibers;

a mixed powder provided in the interstices between said fibers and including a finely divided carbonaceous binder pitch and a finely divided coke; and a flexible sleeve formed of a thermoplastic resin and surrounding said core.

In another aspect the present invention provides a process for the preparation of a preformed yarn useful in forming composite articles, comprising the steps of:

continuously passing a multiplicity of inorganic reinforcing fibers through a bed of a mixed powder including a finely divided carbonaceous binder pitch and a finely divided coke so that the mixed powder is taken in the interstices between said fibers;

assembling said mixed powder-carrying fibers to form a tow with said mixed powder being held between said fibers; and extruding a thermoplastic resin over said tow to form a sleeve surrounding said tow.

Figure 2:
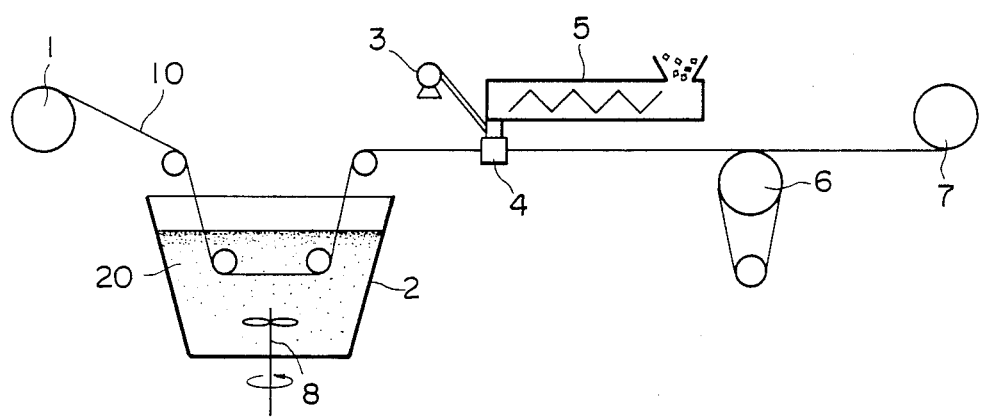

The present invention will now be described in detail below with reference to the accompanying drawing, in which:

FIG. 1 is a cross section of a preformed yarn according to the present invention; and FIG. 2 is a diagrammatic illustration of an apparatus suitable for the preparation of the preformed yarn according to the present invention.

Referring first to FIG. 1, the reference numeral 10 designates inorganic reinforcing fibers, generally continuous fibers, constituting a core or tow. The reinforcing fibers 10 may be, for example, carbon fibers, SiC fibers, alumina fibers, glass fibers and mixtures thereof. Of these, the use of carbon fibers is preferred. Flame proof fibers, infusible pitch fibers and surface-treated fibers thereof, which are precursors of carbon fibers, are also be suitably used for the purpose of the present invention.

Methods of the fabrication of carbon fibers are generally classified into two groups according to the types of the starting materials. The first method uses petroleum pitch or coal tar pitch as a precursor raw material whereas the second method carbonizes natural or synthetic fibers used as a raw material. Carbon fibers obtained by both of these methods may be used in the present invention. In the first method, pitch is first treated to obtain spinnable pitch, spinning the pitch, rendering the spun fibers infusible and then carbonizing the infusible fibers. For example, pitch is reformed to have a softening point of 180°-300° C., spun into fibers at a temperature of 250°-300° C. and treated with an oxidizing gas at 150°-300° C. to obtain infusible fibers which in turn are carbonized at 800°-2500° C. In the second method, organic fibers such as celullose fibers and acrylic fibers are processed to have flame-resistant properties and are then carbonized.

The inorganic reinforcing fibers preferably have a filament denier number ranging from about 0.05 to about 600 and filament counts ranging from about 50 to about 300,000, more preferably a filament denier number ranging from about 0.25 to about 16 and filament counts ranging from about 100 to about 48,000.

The amount of the reinforcing fibers is preferably 5-70%, more preferably 20-60% based on the total volume of the preformed yarn. When the conent of the reinforcing fibers is below 5% by volume, the carbonized composite articles obtained therefrom tends to be unsatisfactory in bending strength. On the other hand when the amount of the reinforcing fibers exceeds 70% by volume, the fibers in the carbonized composite articles tend to become low in mechanical strengths because of the lack of the binder.

Referring continuously to FIG. 1, in the interstices between the reinforcing fibers 10 are provided finely divided, mixed powder 20 including finely divided caronaceous binder pitch and finely divided coke.

The carbonaceous binder pitch is preferably petroleum or coal binder pitch, more preferably isotropic, latently anisotropic or anisotropic binder pitch derived from petroleum or coal and having a melting point of 60°-320° C., more preferably 180°-300° C., a quinoline insoluble content of 0-80% by weight, more preferably 30-70% by weight, and a volatile matter content of 5-60% by weight, more preferably 10-30% by weight. As the petroleum or coal pitch, there may be mentioned pitch obtained by heating a petroleum-derived heavy hydrocarbon oil such as an atmospheric residue, a vacuum residue or a catalytic cracking residue or a coal-derived heavy hydrocarbon oil such as coal tar or a sand oil at an elevated temperature, generally 350°–500° C. Mesophase spheres obtained from such a petroluem or coal pitch and bulk mesophase obtained from the mesophase spheres by growth and coalescence thereof may also be suitably used for the purpose of the present invention.

The carbonaceous binder pitch has preferably an average particle diameter of 0.5–60 μm, more preferably 3–20 μm. Binder pitch with an average particle diameter of less than 0.5 μm tends to loose fluidity and becomes difficult to uniformly fill the interstices of the inorganic reinforcing fibers. On the other hand, too large an average particle diameter in excess of 60 μm also causes difficulties in being uniformly dispersed into the void spaces between the reinforcing fibers.

The finely divided coke to be mixed with the carbonaceous binder pitch is preferably a substantially unsoftenable coke having a volatile matter content of 10% by weight or less, more preferably 2% or less. A volatile matter content of the coke above 10% by weight tends to cause the formation of crack in the carbonized articles obtained therefrom. Coke derived from petroleum or coal may be suitably used.

The average particle size of the coke is preferably in the range of 0.5 to 30 μm, more preferably 1 to 20 μm. An average particle size of below 0.5 μm tends to cause difficulties in uniformly distributing the coke particles within the interstices of reinforcing fibers due to low fluidity. Too large an average particle size in excess of 30 μm, on the other hand, tends to injure the reinforcing fibers and to cause the formation of pores or cracks in the carbonized products.

The blending ratio by weight of the binder pitch to the coke varies with the intended use of the carbonized articles to be produced, but generally in the range of 9:1 to 1:9. The blending ratio is preferably 7:3 to 3:7 for reasons of capability of minimizing the size and number of pores in the carbonized product and of reducing the occurrence of cracking.

The mixed powder to be incorporated between the reinforcing fibers may further contain metal powder capable of forming a metal carbide when the preformed yarn is subjected to carbonization conditions. Examples of such metal include Ti, Si, Fe, W and Mo. These metals form carbides during carbonization treatment of the yarn and serve to improve the abrasion resistance, hardness and mechnical strength of the carbonized composite articles. The metal powder preferably has an average particle size of in the range of 0.5 to 30 μm. The content of the metal powder is preferably 0.5 to 50, more preferably 3–20% based on the total weight of the mixed powder.

Further, for the purpose of improving mechanical properties at high temperature of the carbonized product, an additive such as a metal, an inorganic compound or a thermosetting resin may be incorporated into the mixed powder. Examples of suitable metals include Cu, Al, Sn, Pb, Bi, Sb, Zn, Mg, Ag and Cu-Zn. Examples of inorganic compounds in clude SiC, $Pb_3O_4$, CdO, $Al_2O_3$, MgO, $Fe_2O_3$, ZnO, $Cr_2O_3$, $CaCO_3$ and $BaSO_4$. Examples of thermosetting resins include a phenol resin, unsaturated polyester resins, epoxy resins, silicone resins, aromatic hydrocarbon resins and urea resins. Such an additive has preferably an average particle size of 0.5 to 30 μm. The amount of the additive to be blended into the mixed powder is preferably 0.5–50%, more preferably 3–20% based on the total weight of the mixed powder.

As shown in FIG. 1, the tow or core of a multiplicity of the reinforcing fibers 10 holding therebetween the mixed powder 20 is covered with a sleeve or sheath 30 formed of a thermoplastic resin.

The sleeve 30 is preferably formed of an easily decomposable and vaporizable, low softening point thermoplastic resin such as a polyamide, a polyethylene, a polypropylene, a polyester or polyvinylidene fluoride. Above all, the use of a polyethylene or polypropylene is preferred for reasons of inexpensiveness and capability of forming a thin sleeve. The thickness of the sleeve 30 is not specifically limited. However, as long as the workability or processability of the preformed yarn is not adversely affected, the use of a thinner sleeve is more preferred for improving the properties of composite articles. The use of a sleeve with a thickness of 7–30 μm is recommended. Because of the presence of the sleeve 30, the core of the fibers 10 and mixed powder 20 is protected from inclusion of impurities or moisture therein and from being damaged or fuzzed. It is preferred that the sleeve 30 be in close contact or shrunk fit with the core so as to minimize the void space between the core and sleeve and within the core. Such a close contact is desirable for minimizing the inclusion of air in the preformed yarn and, therefore, minimizing the occurrence of pores within the final composite articles.

The process for the fabrication of the above-described preformed yarn will now be described below with reference to FIG. 2. A bundle of continuous reinforcing fibers 10 wound on a bobbin (not shown) is continuously fed through an unwinding equipment 1 to a chamber 2 containing a mass of a mixed powder 20 including binder pitch and coke. An agitator 8 is disposed in the chamber 2 for mixing the powder 20. The mixing of the powder 20 may also be effected by feeding a fluidizing gas such as air or nitrogen from the bottom of the chamber 2 so as to maintain the mixed powder 20 in a fluidized state. The bundle of the fibers 10 is spread or loosened by any suitable means such as air injection device or rollers and the spread fibers 10 are brought into contact with the mixed powder 20 so that the mixed powder 20 is taken between the fibers 10.

The fibers 10 holding the mixed powder therebetween are then assembled into a core or tow which is then covered with a sleeve in a sleeve forming device composed of a cross head 4 and an extruder 5. Designated as 3 is a vacuum pump connected to the cross head 4 for shrinkingly fitting the sleeve over the core and for providing tight bonding between the sleeve and the core.

The preformed yarn thus prepared is then cooled in a cooling zone (not shown) and wound on a take-up roller 7. Designated as 6 is a feed roller for drawing the preformed yarn at a constant speed.

If desired, the tow provided with the sleeve therearound may be processed, before cooling, by means of a stamping or knot forming device to form a plurality of axially spaced apart, thin, annular, depressed portions on the outer periphery of the sleeve by radially inwardly pressing, with heating, the preformed yarn so as to tighten the sleeve and the core together. The provision of the knots is desirable in an instance where the preformed yarn is cut into a desired length, since escape of the mixed powder from the yarn can be minimized.

The preformed yarn according to the present invention finds utility in, for example, the production of inorganic fiber-reinforced composite articles which are to be used under high temperature and high mechanical stress conditions. Such composite articles may be easily prepared by, for example, filament winding or hot pressing in a simple manner.

When the preformed yarn according to the present invention is subjected to hot pressing at a temperature of 400° C. or more, especially 600° C. or more, the shaped body produced is almost free of volatile matters and, therefore, the succeeding carbonizing or graphatizing treatment can be performed without encountering problems of generation of gases. Thus, the composite articles obtained with the use of the preformed yarns of this invention is substantially free of pores. Moreover, since the binder pitch powder and coke powder are homogeneously distributed in the interstices of the reinforcing fibers (in other words, the reinforcing fibers are homogeneously dispersed in the matrix of binder pitch and coke powder), the composite articles obtained therefrom are uniform in physical properties. The preformed yarn is also very suited for the production of composite articles having complex shapes and small radii of curvature.

The following examples will further illustrate the present invention.

EXAMPLE 1

A bundle of carbon fibers having a filament counts of 3000, a filament diameter of 10 $\mu$m, a tensile strength of 310 kg/mm$^2$, a modulus of 22×10$^3$ kg/mm$^2$ and an elongation of 1.4% was continuously passed through a mass of mixed powder at a rate of 50 m/min and a drawing tension of 30 g. The mixed powder was a 1:1 (by weight) mixture of a petroleum binder pitch having a particle size of 3–20 $\mu$m, a softening point of 260° C., a volatile matter content of 30 weight % and a quinoline insoluble content of 50 weight % and a coal-derived coke having a particle size of 3–10 $\mu$m and a volatile matter content of 1 weight %. The carbon fibers between which the mixed powder was held were then fed to a sleeve-forming cross head connected to an extruder where a polyethylene was extruded over the carbon fibers to form a sleeve therearound. The sleeve had a thickness of 8 $\mu$m and an inner diameter of 2.5 mm. The thus obtained preformed yarn was wound around a vobbin at a rate of 50 m/min. The preformed yarn was constituted of 58% by volume of the mixed powder, 34% by volume of the carbon fibers and 8% by volume of the sleeve.

The yarn was woven to form uni-directional sheets and 12 sheets of the woven sheets are superimposed on one another and subjected to hot press at a temperature of 600° C., a pressure of 500 kg/cm$^2$ and a pressing time of 20 minutes to obtain a composite material having a bending strength of 1500 kg/cm$^2$, a density of 1.58 g/cm$^3$ and a fiber content of 40% by volume. The composite material was then calcined at 1500° C. for 30 minutes to obtain a C—C composite having a bending strength of 1300 kg/cm$^2$ and a density of 1.80g/cm$^3$.

EXAMPLE 2

The preformed yarn obtained in Example 1 was woven by means of a rapier loom to obtain a plain weave fabric. 20 Sheets of the fabrics were superimposed and subjected to hot press at a temperature of 600° C., a pressure of 500 kg/cm$^2$ and a pressing time of 20 minutes to obtain a composite material having a bending strength of 1000 kg/cm$^2$ and a density of 1.65 g/cm$^3$.

EXAMPLE 3

Example 1 was repeated in the same manner as described except that a silicon metal powder with a particle size of 3–10 $\mu$m was added to the mixed powder in an amount of 5% based on the weight of the coke powder. A composite material having a bending strength of 1720 kg/cm$^2$ and a density of 1.61 g/cm$^3$ was obtained. The composite material was then calcined at 1600° C. for 30 minutes in the atmosphere of nitrogen to obtain a C—C composite having a bending strength of 1690 kg/cm$^2$ and a density of 1.83 g/cm$^3$.

COMPARATIVE EXAMPLE 1

The 1:1 (by weight) mixture of the binder pitch and coke used in Example 1 was heated to 370° C. to obtain a melt in which a plain weave carbon fiber fabric was immersed for impregnation. 20 Sheets of the thus treated fabrics having a fiber content of 40% by volume were superimposed and subjected to hot press in the same manner as in Example 1 to obtain a composite material having a bending strength of 410 kg/cm$^2$ and a density of 1.60 g/cm$^3$.

COMPARATIVE EXAMPLE 2

The 1:1 (by weight) mixture of the binder pitch and coke used in Example 1 was scattered over plain weave carbon fiber fabric. Another sheet of the fabric was then superimposed on the mixed powder layer, on which another mixed powder layer was provided. The same procedure was repeated to obtain a laminate composed of alternately superimposed 20 sheets of carbon fiber fabrics and 20 layers of the mixed powder and having a carbon fiber content of 40% by volume. The laminate was subjected to hot press in the same manner as in Example 1 to obtain a composite material having a bending strength of 210 kg/cm$^2$ and a density of 1.60 g/cm$^3$.

COMPARATIVE EXAMPLE 3

Example 2 was repeated in the same manner as described except that nylon-6 (thermoplastic resin) having a particle size of 20–40 $\mu$m was substituted for the mixed powder. The composite material obtained by the hot press was crumbly due to the decomposition of the thermoplastic resin during the hot pressing.

COMPARATIVE EXAMPLE 4

Example 2 was repeated in the same manner as described except that the binder pitch powder alone was used in place of the mixed powder. The composite material obtained as a result of the hot press had a bending strength of 450 kg/cm$^2$, a density of 1.58 g/cm$^3$ and a carbon fiber content of 45% by volume. Cracks were observed in the composite material.

COMPARATIVE EXAMPLE 5

Example 2 was repeated in the same manner as described except that the coke powder alone was used in place of the mixed powder. Hot press of the fabric failed to give a composite material.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

We claim:

1. A preformed yarn useful in forming composite articles, comprising:

a core of a multiplicity of inorganic reinforcing fibers;

a mixed powder provided in the interstices between said fibers and including a finely divided carbonaceous binder pitch and a finely divided coke; and a flexible sleeve formed of a thermoplastic resin and surrounding said core.

2. A preformed yarn according to claim 1, wherein the weight ratio of said pitch to said coke is in the range of 1:9 to 9:1.

3. A preformed yarn according to claim 1, wherein the content of said inorganic reinforcing fibers is in the range of 5 70% based on the volume of the preformed yarn.

4. A preformed yarn according to claim 1, wherein said mixed powder further includes a finely divided metal powder capable of forming a metal carbide when the preformed yarn is subjected to conditions under which said coke and pitch are carbonized.

5. A preformed yarn according to claim 1, wherein said sleeve is in close contact with the periphery of said core.

6. A preformed yarn according to claim 1, wherein the outer periphery of said sleeve is provided with a plurality of longitudinally spaced apart, thin, annular, pressed portions so that said sleeve and said core are tightened together at the pressed portions.

* * * * *

UNITED STATES PATENT AND TRADEMARK OFFICE
CERTIFICATE OF CORRECTION

PATENT NO. : 4,772,502
DATED : September 20, 1988
INVENTOR(S) : OKURA et al

It is certified that error appears in the above-identified patent and that said Letters Patent is hereby corrected as shown below:

IN THE CLAIMS:

Col. 8, line 3, "5 70%" should read --5 to 70%--.

Signed and Sealed this

Thirteenth Day of June, 1989

Attest:

DONALD J. QUIGG

*Attesting Officer*  *Commissioner of Patents and Trademarks*